United States Patent [19]

Thomas

[11] 3,967,538
[45] July 6, 1976

[54] HYDRAULIC BOOSTER

[75] Inventor: Alfred William Thomas, Saarbrucken, Germany

[73] Assignee: Deutsche Bendix Ausrustungs GmbH, Saarbruecken, Germany

[22] Filed: Mar. 17, 1975

[21] Appl. No.: 559,201

[30] Foreign Application Priority Data
Mar. 19, 1974 Germany............................ 2413079
Mar. 19, 1974 Germany............................ 2413080

[52] U.S. Cl................................ 91/391 R; 91/422; 91/460; 91/433
[51] Int. Cl.² ..................... F15B 13/10; F15B 11/08; F15B 13/042
[58] Field of Search.................. 91/460, 391 R, 422, 91/433; 60/555, 548, 587

[56] References Cited
UNITED STATES PATENTS
3,831,491  8/1974  Thomas .................................. 91/460
3,838,629  10/1974  Meyers............................... 91/391 R

*Primary Examiner*—Paul E. Maslousky
*Attorney, Agent, or Firm*—Ken C. Decker; William N. Antonis

[57]  ABSTRACT

A hydraulic booster is disclosed which includes a control valve comprising a sleeve-shaped spool and a control piston slidably mounted at one end of said spool. The control piston projects into a control chamber filled with hydraulic fluid and in which are movable an operator-operated input member and an output member connected to a boost piston slidably mounted in a working chamber. The pressure generated in the control chamber shifts the control piston and the spool to a position admitting fluid pressure from a pump into the working chamber. The ratio of the effective areas of the control valve respectively submitted to the control pressure and to the pressure prevailing in the working chamber is about two.

5 Claims, 6 Drawing Figures

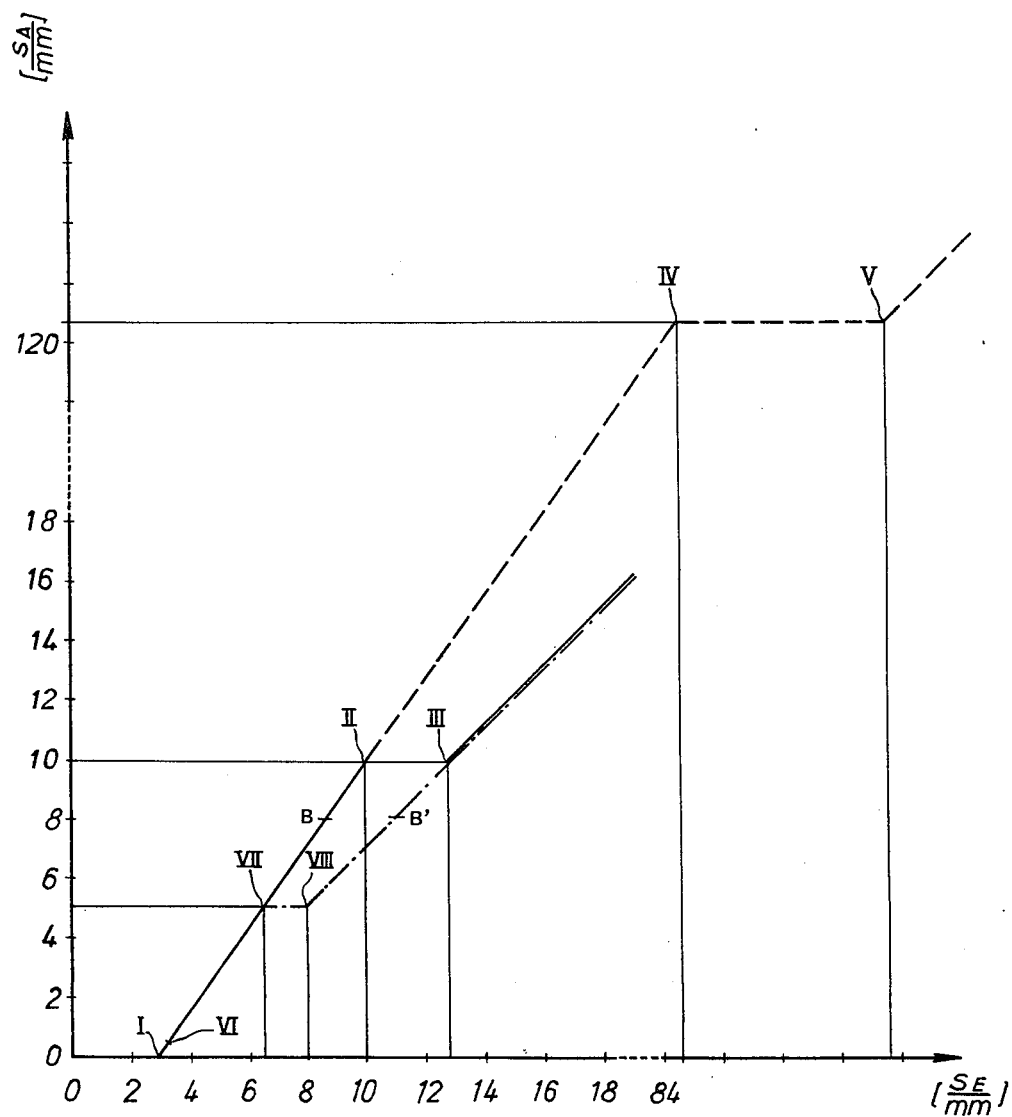

HYDRAULIC BOOSTER

The invention relates to a hydraulic booster responsive to an operator operated actuation of an input element for controlling the hydraulic force adapted to act on an output piston. For example such booster may be located in a vehicle hydraulic brake system wherein said input element and said output piston are connected to a brake pedal and a master-cylinder respectively.

Hydraulic boosters used in a vehicle braking system are known from U.S. Pat. No. 3,831,491. In the device described therein, substantially the same pressures prevail in the control chamber and in the working chamber. This is achieved by providing the control valve with a control piston mounted so that the control pressure acts on one of its faces and working pressure acts on its other face, the two faces having equal effective areas. Since the working pressure can reach a relatively high value, the control pressure can also be relatively significant.

As known from the above referenced patent, the working pressure is obtained by a pump of the vehicle. Since the pump is normally provided and is used for supplying fluid pressure into a power steering device, the maximum fluid pressure must be adjusted to a predetermined value. A second predetermined value represents the maximum output force to be delivered by the hydraulic booster for correct operation of the vehicle's brakes. From these two predetermined values, the diameter of the output piston of the booster is automatically determined. A fourth predetermined value corresponds to the input force acting on the booster, which for instance, results from actuation of the brake pedal by the vehicle operator. This together with the foregoing values determines the fifth value corresponding to the servoratio of the booster, i.e., the output/input force ratio. This in turn determines the diameter of the input piston of the booster. However, the diameter of the input piston must have a minimum value. In effect the greater the diameter of the input piston, the smaller is the stroke loss resulting from the volume of pressure fluid necessary for actuating the control valve.

Another problem is represented by the high pressure levels in the control chamber. Due to the high pressure levels, there results a significant wear of the seal rings, in particular when a seal ring is provided on said input piston said latter seal ring having to slide across a compensating orifice. The greater the control pressure, the greater is the groove worn in the seal ring after a given working time period. This involves a reduction of the duration of the life of said seal ring.

The object of the invention is to provide an improved booster, wherein the control pressure as well as the displacement of the input control member necessary for control, are reduced. According to the invention, the effective areas of the faces of the control valve respectively subjected to the pressures prevailing in the control chamber and to the counter pressure in the working chamber is more than unity. It results therefrom that under normal operation the control pressure is lower than the working pressure.

The advantages resulting from the invention are the following: by the use of a larger input piston, a greater control fluid volume can be moved from the same stroke of the input piston. This affords greater flexibility in the choice of the value of the diameter of the valve control piston. A greater moved volume involves a reduced "failure sensitivity" of the control device. Furthermore, in case of a slight leakage between the working and the control chambers the fluid under pressure in the working chambers will tend to flow from said chambers into the control chambers increasing pressure in the control chambers and therefore tending to increase output force. Such a leakage does not induce a decrease of boost such as happened in the prior device, but induces an increase.

It had been also noticed with boosters of the type disclosed in U.S. Pat. No. 3,831,491 that when such a braking device is actuated over its boost run-out point which is the maximum point available from the boost pressure source, it results in an undesirable shape of the curve representing displacements of the output member versus displacement of input member. In a conventional vehicle braking system, the boost run-out point is not reached, since the braking systems are so constructed that the run-out point is chosen above the wheel locking point, that is to say a locking of the braking wheels happens consequently on a high braking force much before the boost run-out pressure is reached.

However, in some cases, the run-out point and also the locking of the wheels are reached, for instance when the pressure available from the vehicle pump has dropped for any reason and even if a pressure accumulator is provided in the hydraulic system. In effect, although the accumulator is charged to be in maximum pressure, the latter is progressively drained after each actuation of the vehicle brakes. In both cases the run-out point can be reached before the wheel locking point.

Another object of the invention is to improve the plotting of the curve, displacement of the output member in relation to displacement of the input member. above the available run-out point. This is obtained by the provision of a non-return valve responsive to pressure prevailing in the working chamber for closing said valve and acting against the pressure in the control chamber, the ratio of the effective cross areas of the valve member in the working chamber and in the control chamber being greater than unity.

Thanks to the invention, a greater control pressure is necessary before the non-return valve opens and the above referenced curve begins to deviate.

In case the area ratio is 6 to 1, this deviation is displaced so far that even when the brakes are actuated with a low run-out pressure for instance when the accumulator is draining, this deviation is not reached. The corresponding device is easy to manufacture when the non-return valve controls a communication between the control chamber and a fluid pressure reservoir. In that case the communication may be indirect, i.e., by the intermediary of a low pressure chamber and the control valve. In particular, in the last case room can be saved when the non-return valve is located inside the working piston.

The invention will be described by way of example with reference to the accompanying drawings wherein:

FIG. 6 represents different plotting of input/output curves of boosters according to the invention and to the prior art.

Figure 1:
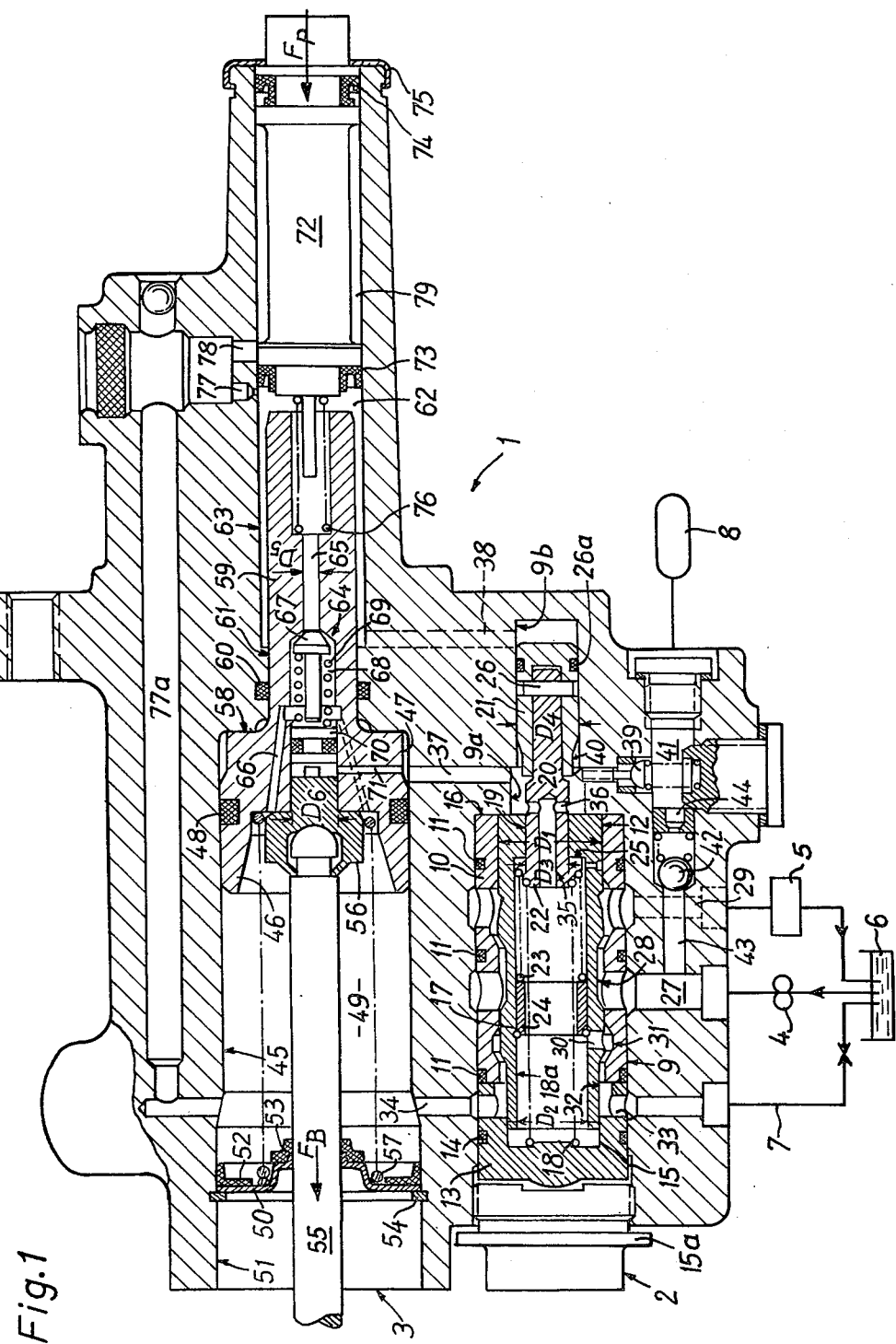
FIG. 1 represents a hydraulic booster for a vehicle braking system according to the invention represented in schematic cross-section.

The booster 1 comprises essentially a control valve 2 and a servo-motor 3 which are located in a common housing made for instance of aluminium. The pressure is supplied to the booster 1 by means of a steering pump 4. The pressure fluid flows through the control valve 2 to a power steering gear 5 having an open-centered valve. For the collection of the fluid a low pressure reservoir is connected with the control valve 2 by means of a conduit 7. A high pressure accumulator 8 is provided as an auxiliary pressure source and can be connected by means of control valve 3 to the hydraulic circuit in case of failure of the main pressure source.

The control valve 2 is mounted in a stepped bore 9. In the larger step is mounted a sleeve 10 made of cast iron and which is provided with seals 11 abutting the aluminum body. The sleeve 10 has an inner bore 12 having a diameter D. The sleeve 10 is surrounded by a cup-shaped socket which is sealed with respect to the bore 9 by means of the seal 14 and which reduces the diameter of bore 9 to the diameter $D_2$ of an inner bore 15. A plug 15a is screwed in the booster housing whereby the sleeve 10 is held in abutment against shoulder 16. Inside bores 12 and 15 a hollow spool 17 is introduced. The control spool 17 is maintained in its rest position against the shoulder 16, by means of a spring 18 itself supported by the socket 13. The control spool 17 comprises an inner bore 18a, which presents a portion of reduced diameter $D_3$, at its end adjacent to the smaller steps of bore 9. The rod 20 of a control piston 21 is slidably mounted in bore 19. The rod 20 comprises an enlarged head 22 inside bore 18a, said head 22 being biased by a spring 23 abutting a sleeve 24 secured to the control spool 17. The head 22 can also be engaged by a shoulder 25 in spool 17. The rod 20 projects inside the intermediary step 9a of bore 9 and is secured by a pin 26, to the control piston 21 located inside the smaller step 9b of bore 9 and having a diameter $D_4$. An annular seal 26a is provided for sealing.

The sleeve 10, socket 13 and spool 17 comprise different axial bores and grooves to permit control pressure fluid to flow. Pressure fluid is driven from the pump 4 through a canal 27. Pressurized fluid leaves the booster 1, through the groove 28 and the return line 29, for supplying the power steering gear 5. The bore 18 is connected by means of the bore 30, an annular groove 31, a land 32 on spool 17, and an aperture 33 within the socket 13 on one hand by the conduit 7 to low pressure reservoir 6, and on the other hand, by means of canal 34 to a compartment 49 of the servo-motor 3. Another connection is provided between bore 18a and bore 9a, by means of bores 35 and 36, which are connected with the working chamber 47 of the servo-motor 3 by means of the canal 37.

A valve 39 is used for switching the pressure accumulator 8 in the hydraulic circuit. The valve located in the conduit 41 is actuated by means of a conical ramp 40 provided on the control piston 21. The accumulator is charged from pump 4 by means of a spring biased non-return valve 42. Fluid flows from pump 4 through a conduit 43 the valve 42 and a throttle orifice 44.

Servo-motor 3 circumscribes a stepped bore 45, in which a working piston 46 is provided, thus forming part of a working chamber 47. For sealing with respect to bore 45, a seal 48 is provided. The working chamber 47 is connected with the canal 37 of control valve 2. Close to working chamber 47 a low pressure chamber 49 is provided and is connected with the low pressure reservoir 6 by means of canal 34, and control valve 2. The low pressure chamber 49 is closed by means of a plug 50. Plug 50 is sealed with respect to an enlarged portion 51 of bore 45 by means of seals 52 and 53, and is supported by spring ring 54. Through annular seal 53 a push rod 55 is actuated, said push rod being strongly connected to a usual brake master cylinder (not shown), for transmission of force $F_B$.

The push rod 55 is connected to a plug 56 engaged into the working piston 46. Around the push rod 55 is mounted a spring 57, which is supported at one of its ends by the working piston 46, and at its other end by the plug 50. The working piston 46 is biased towards a shoulder 58 in bore 45 by the spring 57. The working piston 46 comprises portions of different diameters, the smaller of which represents the output control member 59. The output control member projects through a sealed portion 61 of bore, in a control chamber 62. The diameter of bore 63 of control chamber 62, is greater than the diameter of output control member 59.

Inside the output control member 59 and the working piston 46 is provided a valve which controls the connection between control chamber 62 and low pressure chamber 49. The connection is realized by a central bore 65, which opens into the control chamber 62, and by a bore 66 connected to the low pressure chamber 49. A closing valve situated inside a valve chamber 68, is supported by a spring 69 abutting a piston 70. The piston 70 has one face exposed to the low-pressure in the valve chamber 68 and its other face exposed to the pressure in working chamber 47 by means of a conduit 71. After a predetermined stroke the piston 70 abuts the closing valve member 67, and maintains valve 64 closed under the influence of the pressure prevailing in the working chamber 47. The preload of spring 69 is chosen great enough to permit the valve 64 to remain closed when usual minimum control pressure for actuating the spool 17 is attained which is tentatively about 4 kg/cm².

The output control member 59 is mounted in line with an input control member 72. The input control member is constructed as a hydraulic piston, which is sealingly engaged in the control chamber 62, by means of a seal 73. The outer end of the hydraulic piston is provided with another seal ring 74, and abuts an annular surface of a retaining support ring 75 mounted on the body. A return spring 76 is provided between the output control member 59 and the input control member 72. The preload of spring 76 is smaller than preload of spring 57. The input control member 72 is connected to the braking pedal of the vehicle by a rod (not shown on drawings). Immediately before cup seal 73 a compensating port 77 is provided within the body and is connected with a canal 77a, itself being connected to the low pressure chamber 49. An opening 78 leads from canal 77a, to a ring shaped space 79 which surrounds the input control member 72.

Operation of the above described hydraulic booster is the following:

1. In its rest position

In the rest position, as shown in FIG. 1, the pressure fluid connection through groove 28 of spool 17 is open. The working chamber 47 is connected to the low-pressure reservoir 6, since the connection through bore 30 is open, the control chamber 62 is also connected with the low pressure reservoir through compensating port 77, canal 77a, a low pressure chamber 49, canal 34, bore 33 and conduit 7.

2. In case of braking action below the maximum boost pressure level

Figure 2:
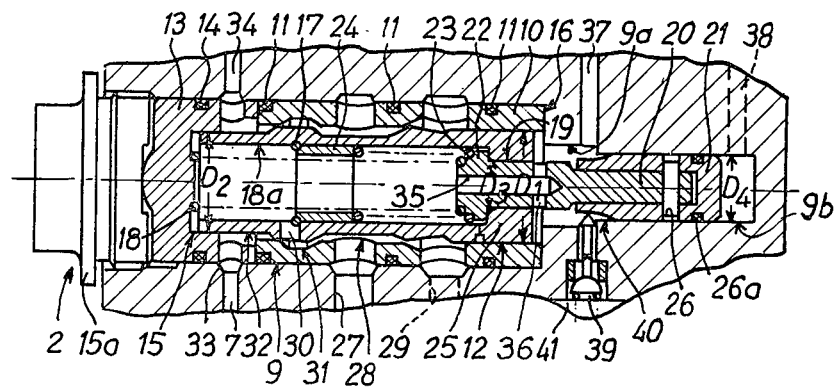
FIG. 2 represents the control valve in a working position under normal braking operation.

When a normal braking occurs, the input control member (see FIG. 2) 72 is pushed towards the left of the Figure under the influence of force $F_p$, and closes the compensating opening 77 by means of seal ring 73. As the force $F_p$ is increased and the input control member 72 is further displaced towards the left, the pressure of the fluid trapped in control chamber 62 rises. Pressure fluid flows from chamber 62 through canal 38 and urges control piston inside the bore $D_4$. The control piston 21 is slidably displaced, and also the control spool 17. Under the displacement of spool valve 17, the connection between bore 30 and groove 31 is closed and the pressure fluid flows from pump 2 through canal 27 whereas return flow through canal 29 is restricted under partial closure of the connection through groove 28. Fluid pressure flows through control groove 28 and annular groove 31 into working chamber 47 through bores 30, 18a, 35, 36, 9a and canal 37. By this operation, working piston 46 is pushed toward the left and braking force $F_B$ is applied through push rod 55. The control pressure urges the spool valve 17, by acting on the circular surface having a diameter $D_4$. The working pressure biases the spool valve 17 in opposition to control pressure by acting on the circular surface having a diameter $D_2$. The spool valve is supported by cylindrical surfaces having $D_1$ and $D_4$ as respective diameters. The diameters are so dimensioned that the control pressure is applied respectively on effective area of the spool valve 17 and of control piston 21, said area having its value doubled when compared to the value of the valve effective area of the cross-section of spool valve 17 to be submitted to the working pressure, this area is given by the area relative to section $D_2$ minus the annular area relative to section $D_1$ minus section $D_4$. When not taking into consideration the friction forces and the resilient force of spring 57, the pressure in control chamber 62 is also half the value of the working pressure in working chamber 47.

3.

Figure 3:
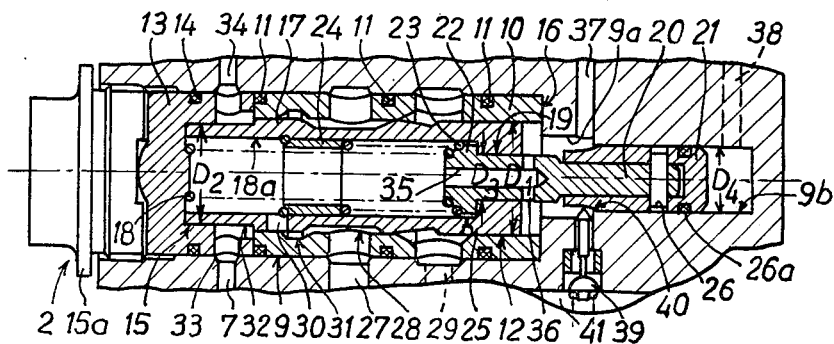
FIG. 3 represents the control valve in another working position when the boost pressure is around its maximum value.

In case of braking action around the maximum boost pressure level (see FIG. 3)

When the pressure in control chamber 62 is so increased that spool 17 comes into abutment on socket 13, the maximum boost pressure level available from the pump is reached. In that case, the valve 39 opens consequently on an increase in pressure in bore 9a, and the pressure accumulator 8 may start to charge. After crossing of control land, the valve 39 is maintained open.

Figure 4:
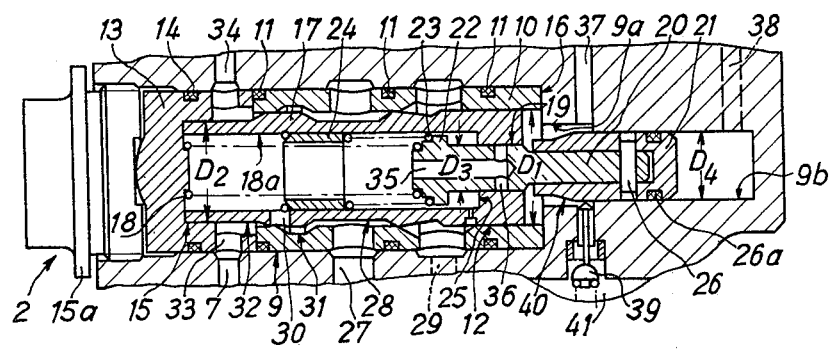
FIG. 4 represents the control valve in still another working position after a pump failure.

4. In case of braking action with a pump failure (see FIG. 4)

If for any reason the pressure delivered by pump 2 fails spool valve 17 is an abutment with socket 13, and the control piston is moved again under the action of control pressure on the spool 17. As a consequence the pre-load force of springs 18 and 23 is overcome. The relative displacements of spool valve 17 and control piston 21 causes the closure of bore 36 after biasing the control piston 21 into bore 19. At the same time valve 39 is opened by means of control ramp 40, and the pressure accumulator 8 is switched into the hydraulic circuit. This happens gradually so that a sudden increase in pressure acting on control piston 46 is prevented. The pressure coming from accumulator 8 is directed to working chamber 47 through bore 9a and canal 37. The diameters $D_3$ and $D_4$ are so designed that the circular surface corresponding to $D_4$ has twice the value of the annular surface corresponding the section $D_4$ minus section $D_3$. That means then for control of control pressure, the pressure which is necessary has half the value of the pressure of accumulator.

Figure 5:
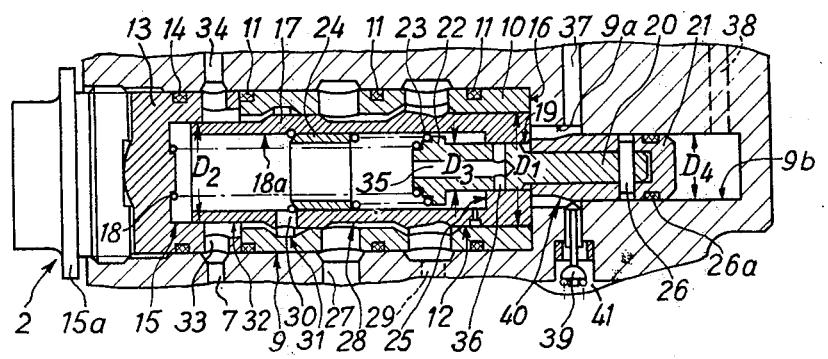
FIG. 5 represents the control valve when the spool is jammed in its bore.

5. In case of braking with spool valve jammed in its rest position (see FIG. 5)

In case the spool valve 17 jams for any reason, in particular inn its rest position, the pump pressure cannot be directed in spool valve 17, i.e., in working chamber 47 by means of groove 28 and bore 30. The braking action is produced in the same manner as when the pump fails (see point 3). The spool valve 17 remains thereby in its rest position, and the control piston 21 is pushed into spool valve 17. Bore 36 is thereby closed and accumulator 8 is switched into the hydraualic circuit by means of valve 39. The system then operates as described in point 3.

The function of valve 64 is the following. In case for any reason, no boost pressure is available in particular even in hydraulic systems provided with an accumulator as a pressure reserve is given up, or when the accumulator becomes emply after a predetermined time period, the actuation of the brakes takes place in the following manner.

After displacement of the input control member 72 relative to output control member 59, the pressure increases in control chamber 62. Control piston 21 and spool valve 17 can be also displaced, but this results in no increase in pressure in the working chamber. After a further increase in pressure, the pressure fluid between input and output control members 72 and 59 would cause the output stroke to remain high in comparison with the input stroke. This can mean that the necessary force $F_p$ for actuating working piston 46 becomes too high. To avoid this, valve 64 is provided. In case of failure of the boost pressure in the working chamber, the valve member 67 opens under the influence of pressure prevailing in control chamber 62, and fluid pressure flows from control chamber 62 into low-pressure chamber 49 through bore 66. This results in an abutment of the input control member 62 with the output control member, and a consecutive rigid mechanical connection of both members. In that way, actuating force $F_p$ is transmitted to working piston 46 without stroke increase.

FIG. 6 shows three curves representing the function $S_A = f(S_E)$ in a schematic and ideal representation, in which $S_A$ is the output member stroke, measured in mm, $S_E$ is the input member stroke, measured in mm.

The first function is represented in full line, and corresponds to a hydraulic booster according to the prior art. After the input member has moved about 3 mm, point I is reached, and the stroke of the output member begins. As a consequence of the stroke implification, output member stroke rapidly increases up to point II. Point II represents the run-out point of the booster at which the maximum available pump pressure is attained. A further increase in the input member stroke causes no more displacement of the output member, since the pressure fluid in the control chamber escapes out therefrom through a valve, until point III is reached. At point III, the input control member abuts the output control member. From point III, every further displacement of the output member is equal to a corresponding displacement of the input member, so that the surve presents a 45° angle with each coordinate axis. Normally the wheel locking point of vehicle is situated in the vicinity of point B, so that every operation over point II is meaningless with regard to a braking action. The "collapse" of the pedal due to the portion of the curve between points II and III which normally takes place when the wheels are locked, can lead to the false deduction that the braking system has failed.

However, if the supply of pressure fluid has in fact failed as soon as the maximum point sinks below point B, the driver notices an unexpected collapse of braking pedal.

The second curve is represented in chain line. It corresponds to the characteristic curve of the hydraulic booster according to the invention. This second curve is identical to the first up to point II, and then it continues to rise in the same manner over the maximum point until it reaches point IV at which valve 64 permits escape of the pressure fluid from the control chamber. Since the diameters $D_5$ and $D_6$ are designed with a ratio of 1 to 2.5 giving a surface ratio of 6 and since when the maximum point is reached the working pressure is twice the control pressure as explained before and that this working pressure remains steady, the control pressure must increase 12 times to permit the valve 64 to open. This means that valve 64 opens much later, in comparison with the first case. At point V the input control member 72 comes into abutment with output control member 59, and both members are joined together so as to be one, and are then displaced together. The shape of the curve over the point II is purely theoretical. In practice, such strokes of control members and the corresponding pressures cannot be obtained. The characteristic of the second curve has a practical meaning when the maximum point sinks, i.e., when a failure in the supply from pump 2 happens, or when the accumulator is used as an auxiliary pressure reserve.

In that case, the third curve can be achieved. The third curve is represented by a dotted line. It corresponds to the plotting of the curve, when the pump 2 fails and the accumulator is simultaneously switched in and as a consequence the pressure in the accumulator drops substantially. The maximum point has sunk down to point VI for instance. Then the curve increases again in the same manner, (analogous to part II – IV) and comprises a bent part as point VII. This corresponds to opening of valve 64, and a further actuation over point VIII takes place without any stroke increase. The locking point is there represented as B'. The shape of the third curve is more favorable than the one of the prior art. Maximum point and bent point, i.e., the point at which valve 64 opens and the pressure is allowed to escape from control chamber 62, are distinctive. Even when the maximum point sinks for example, as a consequence of a drop in pressure of the accumulator in case the supply from the pump fails, the curve rises then continuously in response to a corresponding increase of the operator force transmitted by pedal. Only in case of substantial drop in pressure in the accumulator, is a collapse of the brake pedal to be noticed.

I claim:
1. Hydraulic booster comprising:
   housing means defining a working chamber and a control chamber therein;
   a piston slidably mounted in said working chamber;
   valve means responsive to a fluid pressure level in said control chamber to shift from a released position venting said working chamber to communicate successively higher fluid pressure levels into said working chamber as said valve means is shifted from said released position;
   an output plunger operatively connected to said piston and slidably received within said control chamber;
   operator-actuated means including an input plunger slidably received within said control chamber filled with a hydraulic fluid;
   said input plunger having a greater transverse cross sectional area than the output plunger;
   said input plunger being so mounted in said control chamber to actuate said output plunger upon failure of fluid control level in said control chamber to permit direct mechanical actuation of said piston;
   said valve means having one of its faces exposed to the fluid pressure prevailing in the working chamber and the other of its faces exposed to the fluid pressure level prevailing in the control chamber;
   said valve means includes a spool and a control piston cooperating therewith, said control chamber including a portion receiving said control piston, said control piston having a reduced diameter with respect to the spool valve diameter;
   the control piston is telescopically mounted in the spool, said spool being sleeve-shaped to define an inner compartment, the control piston being adapted to be displaced in a limited manner with respect to the spool from a rest-abutting position into which said control piston is biased by a return spring, said control piston having a supply passage permitting the fluid under pressure to flow from the inner compartment of the sleeve-shaped spool to the working chammber, said supply passage being closed under the displacement of the control piston into the spool.

2. Hydraulic booster according to claim 1 wherein said spool controls the supply of fluid from a main source to the working chamber and second valve means controlling communication between an auxiliary pressure accumulator and the working chamber in case of failure of the fluid supply from said main source, said control piston being displaced towards the spool to simultaneously close said supply passage and open said second valve means.

3. Hydraulic booster according to claim 2 wherein the control piston is stepped, the larger diameter portion projecting into the control chamber, the smaller diameter portion being slidably mounted into the spool valve, said piston being maintained in its extreme outward position with respect to the spool valve by a return spring, the differential annular surface between said larger and smaller diameter portions being submitted to the pressure from the accumulator upon switching in of the latter.

4. Hydraulic booster according to claim 3, wherein the ratio of the cross-section areas of the larger and the smaller diameter portions of the control piston is about two.

5. Hydraulic booster comprising housing means defining a working chamber and a control chamber therein;
 a piston slidably mounted in said working chamber;
 valve means responsive to a fluid pressure level in said control chamber to shift from a released position venting said working chamber to communicate successively higher fluid pressure levels into said working chamber as said valve means is shifted from said released position;
 an output plunger operatively connected to said piston and slidably received within said control chamber;
 operator-operated means including an input plunger slidably received within said control chamber filled with a hydraulic fluid;
 relief valve means venting said control chamber when a predetermined difference of the pressures prevailing in the control chamber and the working chamber is reached, said relief valve means including a valve member subjected to the pressure prevailing in said control chamber, a valve seat and a piston member subjected to the pressure prevailing in the working chamber for biasing said valve member on said seat;
 the relief valve means being located inside said piston.

* * * * *